(12) United States Patent  
Tsujihama et al.

(10) Patent No.: US 7,703,189 B2  
(45) Date of Patent: Apr. 27, 2010

(54) ASSEMBLY PLANT AND ASSEMBLY METHOD FOR VEHICLE

(75) Inventors: Shingo Tsujihama, Tokyo (JP); Miyoshi Yumiza, Tokyo (JP); Yoshihiko Koshiishi, Tokyo (JP); Hitoshi Sasaki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 1231 days.

(21) Appl. No.: 10/548,564

(22) PCT Filed: Mar. 10, 2004

(86) PCT No.: PCT/JP2004/003135

§ 371 (c)(1),  
(2), (4) Date: Sep. 12, 2005

(87) PCT Pub. No.: WO2004/080785

PCT Pub. Date: Sep. 23, 2004

(65) Prior Publication Data

US 2006/0179629 A1  Aug. 17, 2006

(30) Foreign Application Priority Data

Mar. 13, 2003  (JP) .............................. 2003-067892

(51) Int. Cl.  
*B21D 39/03* (2006.01)  
*B23Q 7/00* (2006.01)

(52) U.S. Cl. .......................................... 29/431; 29/33 P

(58) Field of Classification Search .................. 29/431, 29/33 P, 897.2, 428, 429, 711, 720, 771, 791, 29/823, 240

See application file for complete search history.

(56) References Cited

U.S. PATENT DOCUMENTS 3,813,789 A * 6/1974 Shelton ........................ 33/503

FOREIGN PATENT DOCUMENTS

| EP | 0 727 345 | 8/1996 |
|---|---|---|
| JP | 6121870 | 1/1986 |
| JP | S61-021870 A | 1/1986 |
| JP | 63-137080 | 6/1988 |
| JP | 265954 | 3/1990 |
| JP | 768436 | 3/1995 |
| JP | 2001191221 | 7/2001 |
| JP | 2001293623 | 10/2001 |
| JP | 2001334419 | 12/2001 |
| JP | 2002-087344 | 3/2002 |
| JP | 2002-087344 A | 3/2002 |
| JP | 3086318 | 3/2002 |
| JP | U3086318 | 3/2002 |
| JP | 2002297221 | 10/2002 |

OTHER PUBLICATIONS

Supplementary European Search Report.

* cited by examiner

*Primary Examiner*—John C Hong  
(74) *Attorney, Agent, or Firm*—Smith, Gambrell & Russell, LLP

(57) ABSTRACT

Supplying work for many parts supplied for vehicle assembly is progressed toward one radiation center, and the supplied parts are assembled into one vehicle on a rotary-type assembly bed provided at the radiation center.

11 Claims, 4 Drawing Sheets

ASSEMBLY PLANT AND ASSEMBLY METHOD FOR VEHICLE

TECHNICAL FIELD

The present invention relates to a work method and plant facilities in an assembling plant for vehicles. The present invention relates to a method for supplying many parts necessary for assembly of vehicle and for assembling vehicles using these many parts. The present invention is implemented in a large-scale assembling plant for mass-producing vehicles.

BACKGROUND ART

Regarding the assembly of motor vehicles, a configuration in which motor vehicles are assembled along one long straight-line shaped conveyor has widely been known conventionally. Specifically, a long straight-line shaped conveyor is arranged in a plant, and along this straight-line shaped conveyor, there are provided assembling stages for successively attaching parts to a vehicle being assembled along this conveyor; for example, an axle module is arranged at the first stage, a frame module is attached to the axle module at the next stage, the frame is turned over on the conveyor and an engine is attached to this frame at the next stage, and a cab is further attached to the frame at the next stage. This straight-line shaped conveyor moves in one direction as the assembling work progresses. At a position at which all of various assembling processes executed along this conveyor have been finished and a predetermined inspection has been completed, the assembled vehicle leaves the conveyor and is delivered.

Regarding this long straight-line shaped conveyor, there have been known a system in which the vehicle being assembled is moved at a fixed slow speed during the operation and a system in which the movement is stopped during the execution of assembling work and the vehicle is moved intermittently in accordance with set timing (tact).

At both sides of the straight-line shaped conveyor, stages for supplying parts and materials for assembly to the assembly line for vehicles are arranged. Specifically, the axle module, frame module, engine, cab etc. are supplied at positions necessary for the assembly line. The configuration is such that these parts and materials are prepared in a mode such as to be capable of being supplied, in principle, in the direction perpendicular to the flow direction of conveyor and are supplied to the conveyor. In the process in which parts and materials are supplied, in addition to work for supplying a member completed as a module onto the conveyor, work for conducting inspections before assembly, which are executed at the final assembling stage of each module and the like work are included.

Regarding the straight-line shaped conveyor of the conventional example, Patent Documents 1 to 3 (applicant: Honda Motor Co., Ltd.) described below have been known. Also, a conventionally known assembly line for vehicles that is not of a straight-line shape has disclosed in Patent Document 4 (applicant: MC Micro in Germany) described below. Also, though not for the assembly of vehicles, an example in which a manufacturing line is formed into a circular shape has been disclosed in Patent Document 5 (applicant: Ricoh Co., Ltd.) described below.

Patent Document 1: JP H10-59233 A
Patent Document 2: JP 2000-18251 A
Patent Document 3: JP 2002-79964 A
Patent Document 4: JP H8-290798 A
Patent Document 5: JP 2002-133710 A

DISCLOSURE OF INVENTION

In a manufacturing method in which the above-described vehicle assembly line formed into a straight-line shape is utilized, a vehicle being assembled during the time from when parts and materials are charged onto the assembly line to when the vehicle is delivered from the outlet of assembly line as a product is a work-in-process good. The work-in-process good requires its cost and its money rate proportional to the time during which the vehicle is present in the manufacturing plant as a work-in-process good. This involves a manufacturing cost in business management.

On the other hand, in recent years, modularization of parts and materials supplied to the vehicle assembling process has progressed. Specifically, parts necessary for assembly, which are supplied onto the vehicle assembly line in the direction perpendicular to the assembly line (direction perpendicular to the flow) are less frequently assembled at the site provided on both sides of the conveyor. Quite often, parts and materials having been assembled at a separate plant are modularized and supplied onto the assembly line. By such modularization, a work place for supplying the parts and materials, which is provided on both sides of the assembly line, has been decreased.

Also, when work is performed on the above-described straight-line shaped assembly line, one worker has a determined post of duty, and, in principle, cannot get involved in work at the next stage or work at the next stage but one. However, a considerably experienced worker also has experience at the next stage and further at the next stage but one. If any problem occurs at one assembling stage, the experienced worker goes to the next stage and further to the next stage but one to give a help, and can often solve the problem within the work time allotted to that stage.

However, for the straight-line shaped assembly line, the work positions are separated when the process progresses. If a problem occurs at a separate stage and the worker goes to that stage to give a help and solve the problem, time is taken before the problem is solved and the worker returns to the position of his/her own post of duty. Therefore, even if the problem is easy to solve, there occurs a situation such that measures suited to the occasion cannot be taken, and hence measures of temporarily stopping the flow of line are taken inevitably. In order to respond to such an unexpected situation occurring at the assembling stage, measures are taken such that the number of workers assigned to a particular stage are increased to provide a margin.

Furthermore, the specifications of vehicle manufactured in recent years have been diversified. For example, some vehicle for which a particular transport company places an order are ordered under condition that some devices mounted as standard specifications are not needed. Also, for other specifications, inversely, devices that are not standard equipment are required to be mounted. If vehicles that have different specifications at detailed points flow on one assembly line, the advance speed of assembly line is matched with the specifications that have a largest number of work stages. Therefore, for the vehicle of specifications that have a small number of work stages, manpower becomes surplus. In other words, an advantage that many vehicles of the same kind are assembled on one line is decreased.

Some assembling work has a property that unless one assembling work is finished, the next assembling work cannot be executed. Whereas, there are many work processes having a property that even in a state in which the work of the preceding stage is not yet executed, the work of the next stage can be started in parallel. If there are stages capable of overlapping in terms of time in this manner, the work time required to assemble one vehicle can be reduced as a whole by contriving the stage arrangement.

The present invention has been made in view of the above-described background, and accordingly an object thereof is to provide a manufacturing method and apparatus that can shorten the time taken as a work-in-process good from when parts are charged to when a completed product is delivered, and hence can reduce the manufacturing cost. An object of the present invention is to provide a vehicle assembling method and apparatus of a new form in which the number of workers assigned on a manufacturing line can substantially be decreased. An object of the present invention is to provide a vehicle assembling method and apparatus in which an economical effect is less impaired even in the case where a vehicle of specifications different from the standard specifications must be manufactured. An object of the present invention is to reduce a plant area required for vehicle assembling work by substantially decreasing a space for supplying parts and materials. An object of the present invention is to provide a method and apparatus capable of shortening time required for the whole of assembling process by partially overlapping the work time for a plurality of work stages needed to assemble one vehicle.

A first aspect of the present invention is an assembling method for a vehicle, characterized in that work for supplying a plurality of parts and materials required for assembly is progressed toward one radiation center, and the supplied parts and materials are assembled into a vehicle on a rotary-type assembly bed provided at the radiation center. That is to say, apart from the concept of a straight-line shaped assembly line having been used conventionally, the configuration is such that assembling work is performed on the rotary-type assembly bed, and the parts and materials are supplied toward the assembly bed. By this configuration, time as a work-in-process good can be shortened, the assembly manpower per one vehicle can be reduced, and specifications different from the standard specifications can be responded to flexibly. Also, the plant area can be reduced.

The configuration can be such that the assembly bed is rotated around the vertical axis in accordance with the progress of assembling work. It is preferable that during the time when the rotary-type assembly bed is turned through 360 degrees, a series of assembling work for one vehicle be progressed to a degree such that the vehicle can leave the assembly bed while running by itself. The rotational speed of the rotary-type assembly bed can be changed in accordance with the progress of assembling work. That is to say, although the manufacturing line must be moved at the same speed as a whole, the rotary-type assembly bed need not necessarily be kept at a constant rotational speed, and the rotational speed of the assembly bed can be changed in accordance with the progress of work.

The configuration can be such that the part supplying work includes work for assembling or fabricating the parts so that the completeness thereof increases toward the radiation center. Also, It is preferable that during the time when the rotary-type assembly bed is turned through 360 degrees, a series of assembling work for one vehicle be progressed to a degree such that the vehicle can leave the assembly bed while running by itself.

A second aspect of the present invention is the configuration of an assembling plant for a vehicle, characterized in that a plurality of part supply areas are arranged in a radial form, one rotary-type assembly bed is arranged at the radiation center, and a means for turning the assembly bed in accordance with the progress of work is provided. Although the expression is a rotary-type "assembly bed", the surface of the assembly bed need not necessarily be planar. The assembly bed has only be such that the vehicle being assembled can be held in a safe state, a foothold for the worker can be provided, the vehicle being assembled can be mounted by electrical power or manual power, and the assembly bed can be turned around a substantially vertical axis.

The plurality of part supply areas can specifically include an axle module assembling area, a frame module assembling area, an engine supplying area, a cab supplying area, and a tire assembling area.

At one position of the part supply areas arranged in the radial form, an inspection device should be arranged in place of the supply area, and a delivery outlet should be provided on the downstream side in the direction of rotation of the assembly bed of the position at which the inspection device is arranged. That is to say, the configuration may be such that necessary assembly is completed when the vehicle being assembled is turned almost one turn (360 degrees rotation) together with the rotary-type assembly bed. However, the configuration is not limited to "one turn", and can be such that the assembly of one vehicle is completed during two or more turns in accordance with the situation such that special and additional specifications are present.

The rotary-type assembly bed may have a construction such that one vehicle being assembled is mounted or may have a construction such that a plurality of vehicles being assembled are mounted at the same time. In either case, the vehicle being assembled should be arranged on the assembly bed so that the longitudinal (imaginary) centerline of the vehicle being assembled intersects the rotation center of the assembly bed. The rotary-type assembly bed can be constructed so as to be supported by an air bearing.

The configuration can be such that in addition to the plurality of part supply areas arranged in a radial form, a part selection area is provided to supply parts necessary for the part supply areas, and there is provided an unmanned carrier which mounts parts supplied from the part selection area and rounds on the outside of the part supply areas arranged in a radial form.

The round frequency of the unmanned carrier is set at a plurality of n times with respect to one turn of the assembly bed. Typically, the value of n is N=4. The part selection area can be provided with a colored display lamp displaying what number the current round is of the plurality of n times. Thereby, worker's mistake can be avoided.

With the manufacturing method in accordance with the present invention, time required for all work stages need not be set evenly as compared with the conventional method in which a plurality of assembling works are performed on one manufacturing line. Therefore, for a series of plural work stages, the time distribution can be set so that time for each work stage is at a necessary minimum independently. Also, the rotation angle speed of the assembly bed need not be uniform with respect to the elapse of time, and can be set independently in accordance with the manpower of each work stage. Therefore, vehicle assembly can be executed in a short period of time as a whole, namely, with less work manpower. Thereby, the number of workers assigned to the assembly process can be decreased, and also the work floor area for each stage can be decreased. By the present invention, the time from when parts and materials are charged to the assembly work site to when the product is obtained is shortened. Therefore, the time for which a semifinished product stays in the plant as a work-in-process good is shortened, so that the manufacturing cost of vehicle is substantially reduced, which achieves a remarkable economical effect.

The present invention is especially advantageous when a vehicle having specifications partially different from the standard specifications is manufactured. By the present invention, the selection width of option for customer's vehicle specifications can be set wider. The present invention can decrease the plant area required for vehicle assembling work.

Further, since the part selection area is provided, and parts are supplied from the part selection area by the unmanned carrier, the part supplying work is made significantly efficient.

BEST MODE FOR CARRYING OUT THE INVENTION

First Embodiment

Figure 1:
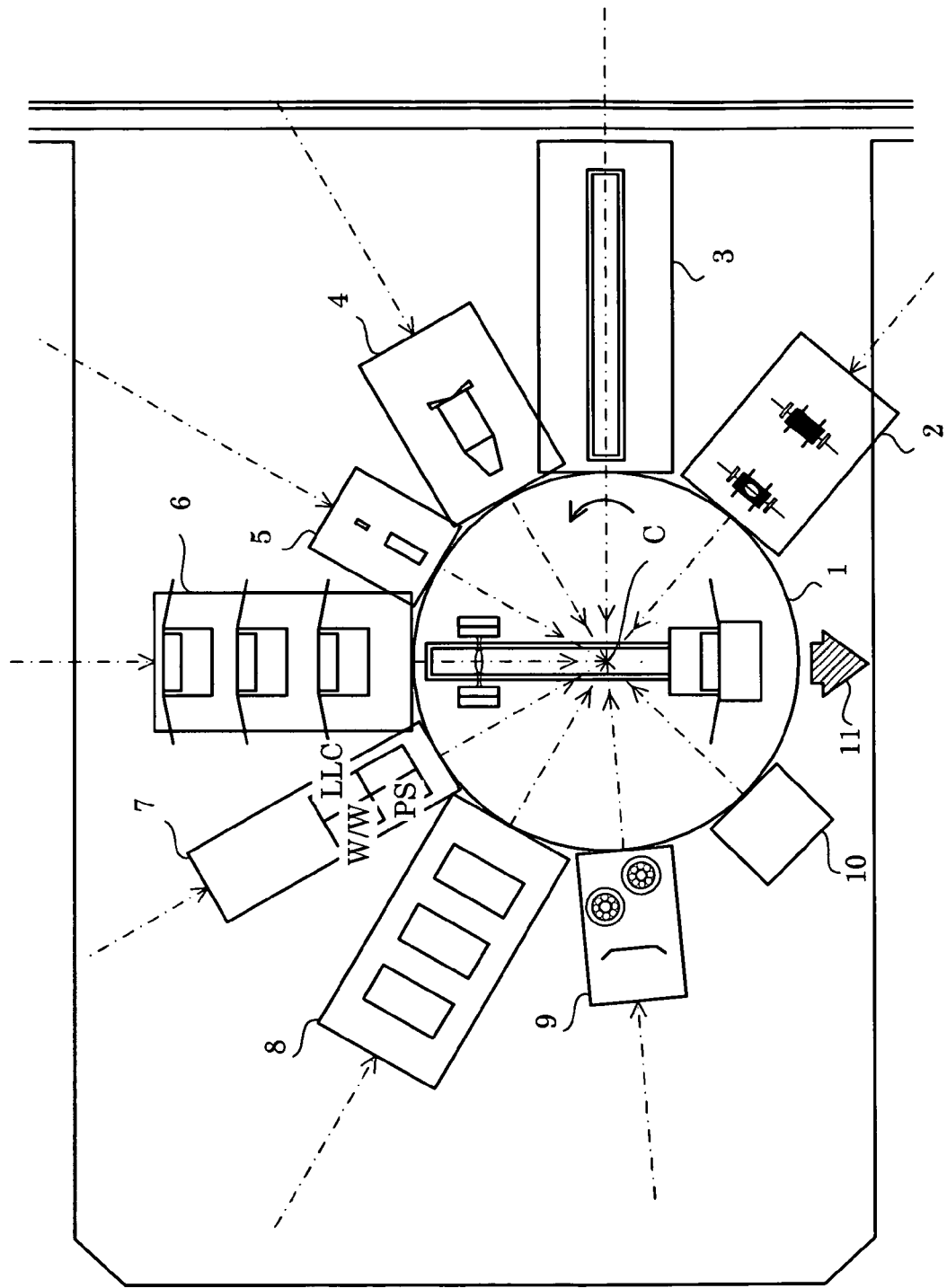
FIG. 1 is a plan view of a plant in accordance with a first embodiment of the present invention (an example in which one vehicle being assembled is mounted on an assembly bed)

The present invention is explained in more detail with reference to the drawings of embodiments. FIG. 1 is a plan arrangement view of a vehicle assembling plant in accordance with a first embodiment of the present invention. That is, at this assembling plant, an assembly bed 1 that rotates around a center C is provided, and a vehicle is assembled on this assembly bed 1 while the assembly bed 1 is rotated intermittently or continuously. The rotation start, rotation stop, and the rotational speed of the assembly bed 1 are controlled by a program control unit, not shown.

In a region developing radially from the center C, a region for supplying parts and materials necessary for the assembly of vehicle is provided. In this region, the configuration is such that the supply work starts at a position distant from the center C and progresses toward the center C. This is indicated by chain-line arrows.

More specifically, in an axle module assembling area 2, materials are supplied from a position farthest from the center C (right lower position in FIG. 1) in the direction indicated by the chain-line arrow, and the assembling work for the axle module progresses toward the center C. The axle module in a state of being capable of being supplied to the assembling work is placed on the assembly bed 1. Thereafter, the rotary-type assembly bed 1 is turned through about 30 degrees to the left (counterclockwise) in the figure. Next, a frame module is supplied from a frame module assembling area 3 onto the rotary-type assembly bed 1. A worker rides on the assembly bed 1 to attach the axle module to the frame module.

In an engine assembling area 4, the assembly of an engine is progressing during this time. Generally, the engine is supplied to the engine assembling area 4 in a state of having been assembled at an engine plant. In this engine assembling area 4, final preparation for attaching the engine to the vehicle body frame is executed. When the assembly bed 1 is turned to a position at which the position of mounted frame coincides with the engine installation position, the engine is supplied from the engine assembling area 4 onto the frame, and the worker executes work for attaching the engine to the frame.

During the progress of this work, the assembly bed 1 is further turned, and various modules necessary for assembly are supplied from an assembly module area 5. Further, during the time when work for attaching the various modules is executed, a cab is supplied from a cab assembling area 6, and is attached to the vehicle frame being assembled. In the cab assembling area 6, materials are supplied from a position farthest from the center C in the same way, and work is continued so that the completeness of cab increases toward the center C.

Next, the assembly bed 1 is further turned, and necessary liquids that are prepared in a liquid pouring area 7 are poured into the vehicle being assembled. The liquids include fuel, brake oil, lubricating oil, and others. After these liquids have been poured, the engine is started.

Further, the assembly bed 1 is turned, and a hood module is supplied from a hood module assembling area 8, by which work for attaching the hood module to the vehicle is executed. The assembly bed 1 is further turned, and tires and bumpers are supplied from a tire/bumper assembling area 9, by which the tires and bumpers are attached to the vehicle being assembled.

Further, the assembly bed 1 is turned so that the front of the assembled vehicle is located so as to face to an inspection device 10. The worker temporarily connects a probe etc. of the inspection device 10 to the completed vehicle, by which various inspections necessary for assembly completion are executed. After the inspections have been completed, the vehicle runs by itself in the direction indicated by an arrow in the figure and is delivered from a delivery outlet 11, or the vehicle is further transferred to a trimming process.

Second Embodiment

Figure 2:
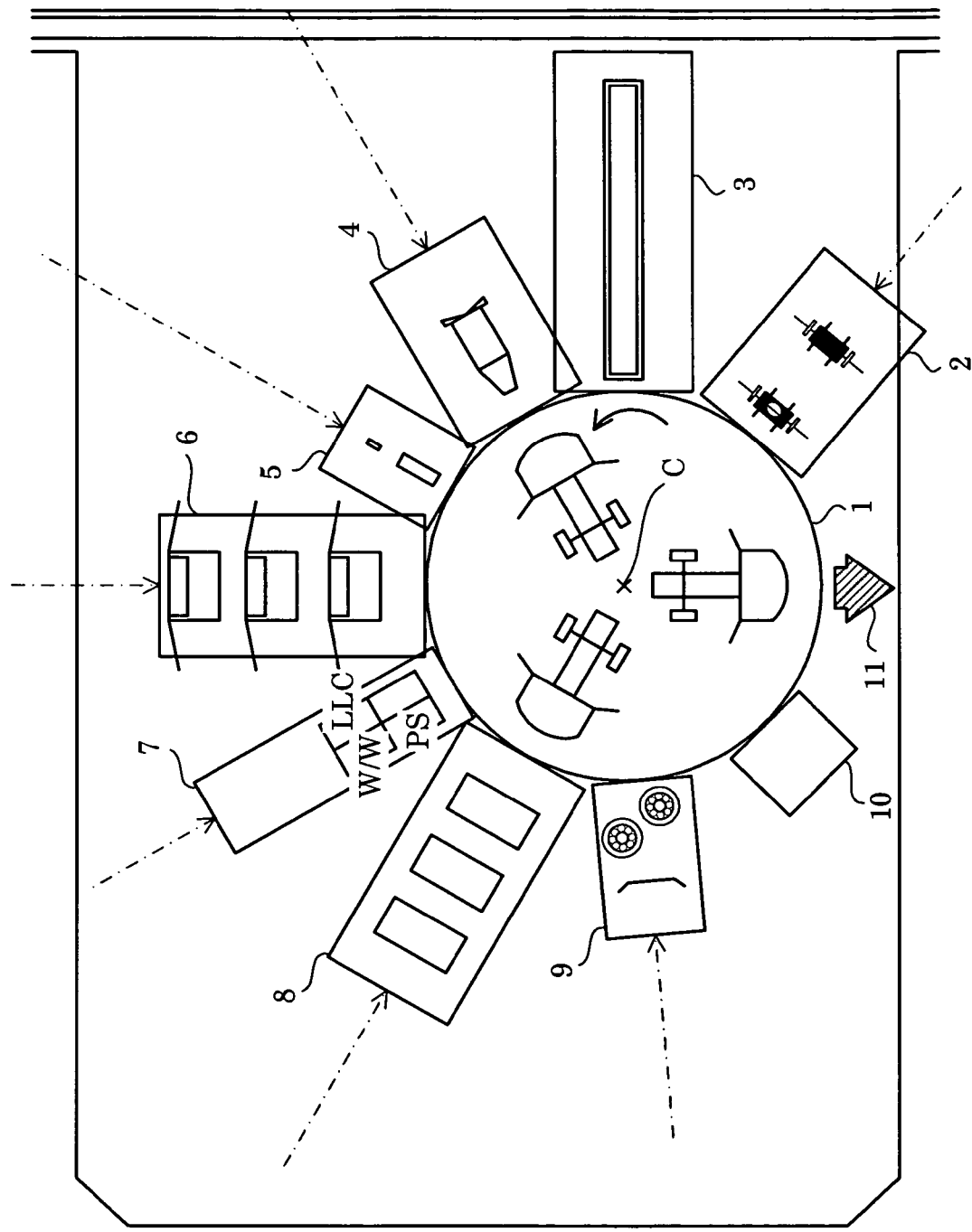
FIG. 2 is a plan view of a plant in accordance with a second embodiment of the present invention (an example in which three vehicles being assembled are mounted on an assembly bed)

FIG. 2 is a plan view of a vehicle assembling plant in accordance with a second embodiment of the present invention. This embodiment is configured so that work for assembling three vehicles continuously at the same time can be executed on the rotary-type assembly bed 1. This assembling work for three vehicles progresses simultaneously with the turning of the assembly bed 1. On the upstream side in the direction of rotation of the assembly bed 1 indicated by an arrow, the completeness of assembly is low, and on the downstream side on which the rotation progresses, the completeness increases. The completed vehicle is delivered in succession from the delivery outlet 11 while running by itself.

In the case of the first embodiment described above, in principle, the worker riding on the assembly bed carries out successive and different works for all stages until the assembly of one vehicle is completed. In other words, the worker executes different works one after another over almost 360 degrees. By contrast, in the case of the second embodiment, workers performing work on the assembly bed can take their shares of the work of the stages. That is to say, the charge is divided according to the rotation angle of assembly bed, and only the work in charge can be executed successively and repeatedly. The worker who performs work in the supply area of each module carries out work to be performed in that area.

In the above-described embodiments, explanation has been given of the example in which one or three vehicles are mounted on the assembly bed. However, the configuration can generally be such that one or a plurality of vehicles are mounted on the assembly bed.

Third Embodiment

Figure 3:
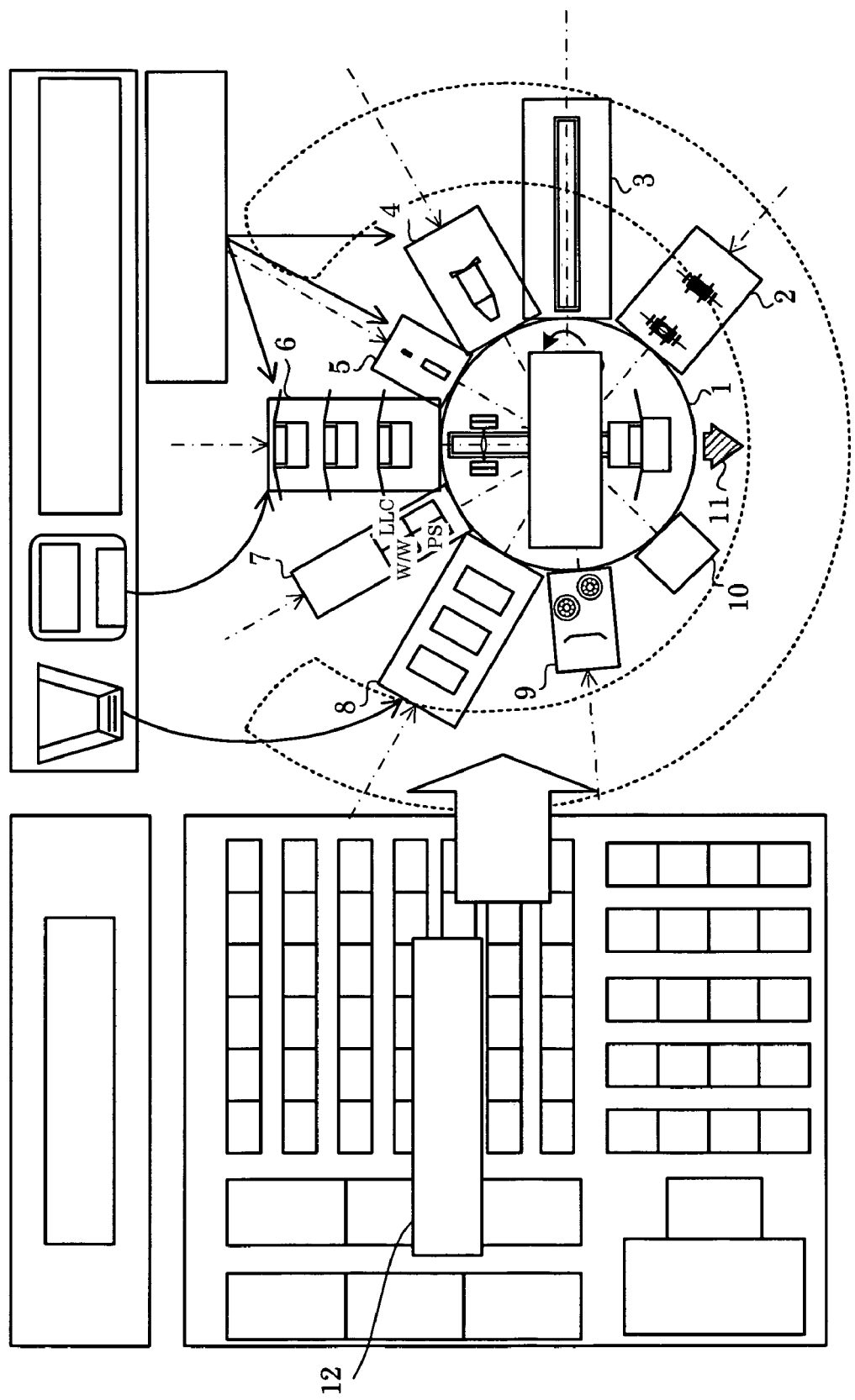
FIG. 3 is a plan view of a plant in accordance with a third embodiment of the present invention.
Figure 4:
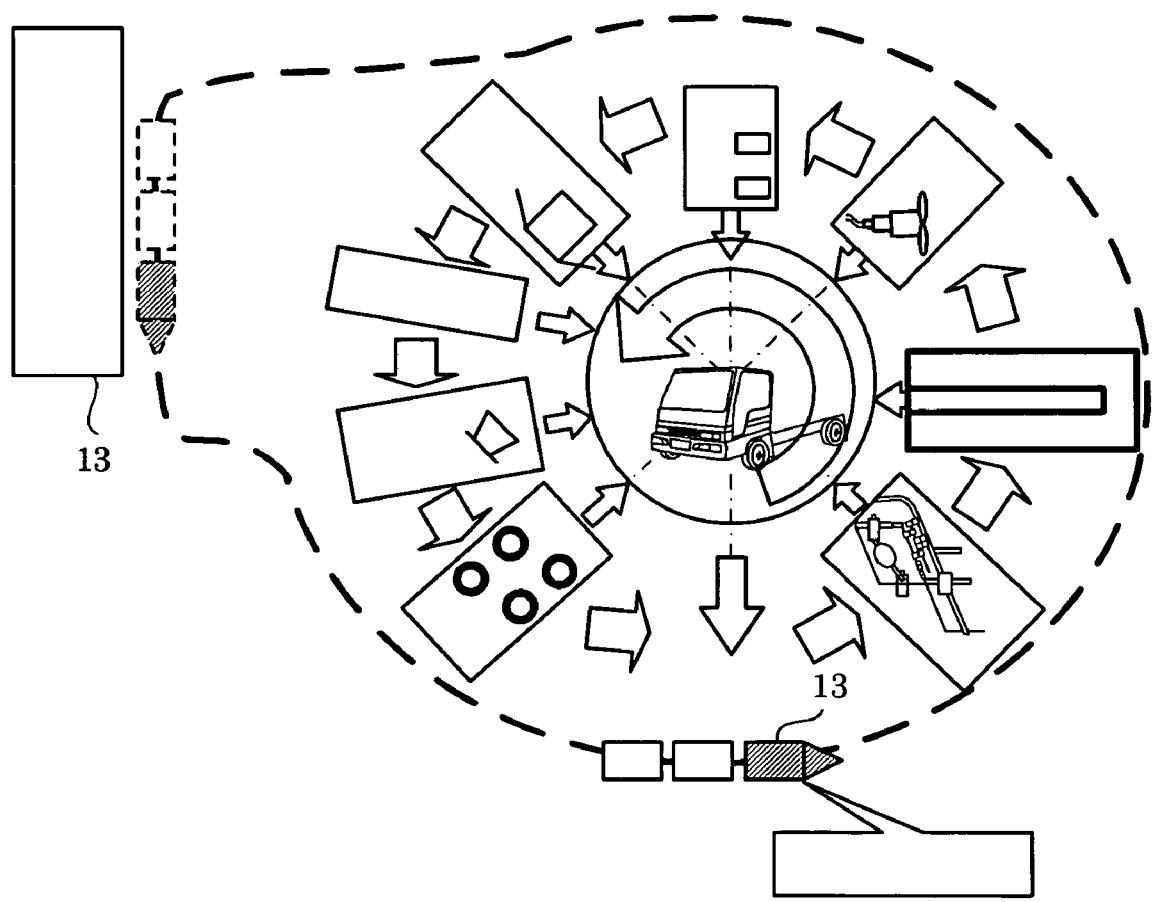
FIG. 4 is a plan view for illustrating a round route for an unmanned carrier in a plant in accordance with the third embodiment of the present invention.

FIG. 3 is a plan view of a vehicle assembling plant in accordance with a third embodiment of the present invention. FIG. 4 is a plan view showing a round route for an unmanned carrier.

This third embodiment is an example in which the process is further improved on the basis of the results of a test in the above-described first embodiment. Specifically, when the test operation was performed, and resultantly it was found that the flow of parts prepared around the assembly bed 1 sometimes stagnates. To overcome this problem, a part selection area 12 was additionally provided at the side of the assembling area. The configuration was made such that parts are collected once in the part selection area 12, and parts and materials are distributed to each of the assembling areas by utilizing the unmanned carrier 13. The unmanned carrier 13 loads up parts and materials in the part selection area 12, and circulates around the assembling areas for the modules while tracing a marking provided on a floor surface by means of automatic operation. In each of the assembling areas 2 to 9, the parts assigned to that area are unloaded from the unmanned carrier 13 arriving at that area. This unloading work is performed by manual work of worker.

The result of trial revealed that a proper round frequency of the unmanned carrier 13 is once in synchronization with an approximately quarter rotation of the assembly bed 1. The unmanned carrier 13 is computer controlled, and hence executes part supply in accordance with the control signal in synchronization with the rotation of the assembly bed 1. By this configuration, the work flow in the module assembling areas was made satisfactory. That is to say, the width for supplying parts could be increased, so that the part supply was smoothened.

As a specific example of control signal, a sign post was erected at a position easily visible from a worker in the part selection area 12, and four-color signal display was provided for each quarter rotation of the assembly bed. Thereby, the worker who loads parts onto the unmanned carrier 13 could know the current work progress, and could properly select the necessary part at necessary timing. The loading of parts onto the unmanned carrier 13 and the taking-out of parts from the unmanned carrier 13 can be performed appropriately by utilizing an auxiliary device such as a crane.

Further, an example of work time is explained below. The test for assembling process is executed by controlling so that the assembly bed 1 is rotated one turn in 50 to 60 minutes. Therefore, the part supply due to the round of the unmanned carrier 13 is carried out every 12 to 15 minutes. This work time can be set so as to be shorter or longer than the above-described time in accordance with the type of vehicle to be assembled or in accordance with the worker's experience in work.

INDUSTRIAL APPLICABILITY

The present invention achieves a great economical effect especially when the invention is implemented in accordance with the inventory control of parts and products. Also, when the area of plant building is limited or when vehicles of a plurality of different specifications must be produced, it is anticipated that the implementation of the present invention is very effective.

The invention claimed is:

1. An assembling method for a vehicle comprising:
    work for supplying a plurality of parts is progressed toward one radiation center, and the supplied plurality of parts are assembled into a vehicle on a rotary-type assembly bed provided at the radiation center; wherein:
    one vehicle being assembled is mounted on said rotary-type assembly bed so that the longitudinal center axis of the vehicle and the axis of rotation of the assembly bed intersect at right angles;
    during the time when the rotary-type assembly bed is turned through 360 degrees, a series of assembling work for said one vehicle is progressed; and
    the vehicle runs by itself to leave the assembly bed.

2. The assembling method for a vehicle according to claim 1, characterized in that the part supplying work includes work for assembling or fabricating the parts so that the completeness thereof increases toward the radiation center.

3. The assembling method for a vehicle according to claim 1, characterized in that the assembly bed is turned around a vertical axis according to the progress of assembling work.

4. The assembling method for a vehicle according to claim 3, characterized in that the rotational speed of the rotary-type assembly bed is changed in accordance with the progress of assembling work.

5. An assembling plant for a vehicle comprising:
    a rotary-type assembly bed on which one vehicle being assembled is mounted so that the longitudinal center axis of the vehicle and the axis of rotation of the assembly bed intersect at right angles;
    a plurality of part supply areas are arranged in a radial form for supplying a plurality of parts sufficient to accomplish manufacturing processes for one vehicle, wherein a series of assembling work for one vehicle can be progressed to a degree such that the vehicle runs by itself to leave the assembly bed during the time when said rotary-type assembly bed is turned through 360 degrees and wherein said rotary-type assembly bed is arranged at the radiation center, and
    a means for turning the assembly bed in accordance with the progress of work.

6. The assembling plant for a vehicle according to claim 5, characterized in that the plurality part supply areas include an axle module assembling area, a frame module assembling area, an engine supplying area, a cab supplying area, and a tire assembling area.

7. The assembling plant for a vehicle according to claim 5, characterized in that at one position of the part supply areas arranged in the radial form, an inspection device is arranged in place of the supply area, and a delivery outlet is provided on the downstream side in the direction of rotation of the assembly bed of the position at which the inspection device is arranged.

8. The assembling plant for a vehicle according to claim 5, characterized in that the rotary-type assembly bed is supported by an air bearing.

9. The assembling plant for a vehicle according to claim 5, characterized in that in addition to the plurality part supply areas arranged in a radial form, a part selection area is provided to supply parts necessary for the part supply areas, and there is provided an unmanned carrier which mounts parts supplied from the part selection area and rounds on the outside of the plurality part supply areas arranged in a radial form.

10. The assembling plant for a vehicle according to claim 9, characterized in that the round frequency of the unmanned carrier is set so as to be a plurality of n times with respect to one turn of the assembly bed.

11. The assembling plant for a vehicle according to claim 10, characterized in that the part selection area is provided with a colored display lamp displaying what number the current round is of the plurality of n times.

* * * * *